United States Patent
Da Cruz Rodrigues et al.

(10) Patent No.: US 12,467,576 B2
(45) Date of Patent: Nov. 11, 2025

(54) MULTI-DIAMETER CLEANING PIG

(71) Applicants: PETRÓLEO BRASILEIRO S.A.—PETROBRAS, Rio de Janeiro (BR); UNIVERSIDADE FEDERAL DE ITAJUBÁ—UNIFEI, Itajubá (BR)

(72) Inventors: Marcelo Da Cruz Rodrigues, Rio de Janeiro (BR); Eduardo Teixeira Da Silva, Rio de Janeiro (BR); Andre Luiz Guedes Maricato, Rio de Janeiro (BR); Volney Soares Lopes, Rio de Janeiro (BR); Ricardo Risso Chaves, Itajubá (BR); Marcos Aurélio De Souza, Itajubá (BR); Marcelo Tai, Jr., Itajubá (BR)

(73) Assignees: PETRÓLEO BRASILEIRO S.A.—PETROBRAS, Rio de Janeiro (BR); UNIVERSIDADE FEDERAL DE ITAJUBÁ—UNIFEI, Itajubá (BR)

( * ) Notice: Subject to any disclaimer, the term of this patent is extended or adjusted under 35 U.S.C. 154(b) by 355 days.

(21) Appl. No.: 18/324,055

(22) Filed: May 25, 2023

(65) Prior Publication Data
US 2023/0400140 A1    Dec. 14, 2023

(30) Foreign Application Priority Data
May 27, 2022    (BR) .................. 10 2022 010400 0

(51) Int. Cl.
*F16L 55/44*    (2006.01)
*B08B 9/043*    (2006.01)
(Continued)

(52) U.S. Cl.
CPC ............ *F16L 55/44* (2013.01); *B08B 9/0436* (2013.01); *F16L 55/28* (2013.01); *F16L 2101/12* (2013.01)

(58) Field of Classification Search
CPC ....... F16L 55/44; F16L 2101/12; F16L 55/28; B08B 9/0436
See application file for complete search history.

(56) References Cited

U.S. PATENT DOCUMENTS 3,495,546 A * 2/1970 Brown .................. G01M 3/005
137/802
4,481,816 A * 11/1984 Prentice .................. G01B 5/12
33/544.2
(Continued)

FOREIGN PATENT DOCUMENTS

BR    PI0405971    8/2006
BR    PI0603022    3/2008
(Continued)

*Primary Examiner* — Ryan J. Walters
(74) *Attorney, Agent, or Firm* — Knobbe, Martens, Olson & Bear, LLP

(57) ABSTRACT

The present invention discloses a pig with improvement in the suspension and centralization system, allowing it to behave properly in any diameter within a design range. The seals in the shape of petals and overlapping discs, responsible for the pressure differential that causes displacement of the pig inside the pipe, were designed to close gradually when necessary, until reaching the minimum internal diameter of the pipe. In this configuration, the face of the seals normally generates a lot of friction with the inner wall of the pipe, making it difficult to move. Metal wafers (11) were developed and applied to the seals to reduce friction. A coupling element (4) was also developed to interconnect the different modules of the pig allowing wide movement of the pig inside the pipe, facilitating its passage by sharp curves and inside the equipment. The pig has petal and disk type seals, mechanical centralization and cleaning module (5) and interconnecting tubes (4).

10 Claims, 3 Drawing Sheets

(51) Int. Cl.
*F16L 55/28* (2006.01)
*F16L 101/12* (2006.01)

(56) References Cited

U.S. PATENT DOCUMENTS

| | | | | |
|---|---|---|---|---|
| 5,029,614 | A * | 7/1991 | Lara | F16L 55/1283 |
| | | | | 73/40.5 R |
| 5,375,530 | A * | 12/1994 | Zollinger | F16L 55/26 |
| | | | | 104/138.1 |
| 5,881,420 | A * | 3/1999 | Bruckelmyer | F23J 3/026 |
| | | | | 15/249.1 |
| 6,339,993 | B1 * | 1/2002 | Comello | F16L 55/28 |
| | | | | 73/866.5 |
| 6,415,722 | B1 | 7/2002 | Reis | |
| 6,672,222 | B2 | 1/2004 | Salvi Dos Reis | |
| 7,328,475 | B2 * | 2/2008 | Smith | B08B 9/0551 |
| | | | | 134/8 |
| 8,281,444 | B2 * | 10/2012 | Rosen | B08B 9/0558 |
| | | | | 134/8 |
| 8,925,590 | B2 * | 1/2015 | Khalifa | F16L 55/1645 |
| | | | | 138/97 |
| 11,098,838 | B2 * | 8/2021 | Grote | B08B 9/0557 |
| 2003/0150351 | A1 | 8/2003 | Salvi Dos Reis | |
| 2015/0337630 | A1 | 11/2015 | Cioanta et al. | |
| 2024/0052962 | A1 | 2/2024 | Lisboa Santos et al. | |

FOREIGN PATENT DOCUMENTS

| | | |
|---|---|---|
| BR | PI0002915 | 5/2009 |
| BR | 102018072062 | 5/2020 |
| CA | 2480534 | 3/2006 |
| CA | 2530932 | 6/2007 |
| CN | 109158390 | 1/2019 |
| GB | 2301414 | 12/1996 |
| GB | 2351304 | 10/2003 |
| KR | 20160023960 | 3/2016 |
| WO | WO 20/082149 | 4/2020 |

* cited by examiner

MULTI-DIAMETER CLEANING PIG

FIELD OF THE INVENTION

The present invention is related to the field of the cleaning pipes that have debris encrusted in the inner wall.

DESCRIPTION OF THE STATE OF THE ART

Petroleum derivatives leave deposits in the pipes that need to be removed periodically; either to improve the flow, or for reasons of pipe integrity, since there is a legal requirement that the pipes must be regularly inspected and, for that, they need to be free of internal residues. There are pipes considered of difficult pigging due to their wide variation in diameter and the presence of equipment installed along their path. The duct that motivated this development has both characteristics.

Pipes with varying diameters are not uncommon in the oil industry, but the greater this variation, the more complex the pipe cleaning process can become. The option to the pig developed in this invention would be the use of foam pig, which deforms enough to travel in a wide range of diameters, but its cleaning efficiency is not very significant.

Document CA2480534C discloses a device for moving a pig, which has at least a front cup and a rear cup adapted to maintain a seal with the conduit in order to propel the device through the conduit. The device has a flexible body interconnecting the front cup and the rear cup. The flexible body is normally installed in a straight position extending along a central axis to keep the front cup and rear cup spaced a predetermined distance apart. The flexible body has predetermined limited flexibility, allowing it to bend about the central axis.

Document CN109158390A discloses a pig comprising an intermediate adapter mechanism, wherein the two ends of the middle adapter mechanism are connected to a cleaning mechanism comprising a support shaft pivotable to the middle adapter mechanism.

Document CA2530932C discloses a trailing pig cleaning device and adapted to be dragged by a pig towing device. The cleaning device collects a predetermined quantity of debris The cleaning device has a continuous outer surface portion of variable diameter.

The prior art documents disclose devices used to clean pipes; however, none of them can perform satisfactorily in pipes with a large variation in internal diameter.

In view of the difficulties present in the State of the Art for solutions for cleaning pipes with a wide variation in internal diameter, it arises the need to develop a technology capable of performing effectively and that is in accordance with the environmental and safety guidelines. The above cited documents do not have the unique characteristics of this invention that will be presented in detail below.

OBJECT OF THE INVENTION

It is an object of this invention to make it possible to clean pipes that include a wide variation in diameter, even greater than 100%.

BRIEF DESCRIPTION OF THE INVENTION

The present invention discloses a pig with improvement in the suspension and centralization system, allowing it to behave properly in any diameter within a design range.

The subject pig is provided with polymeric seals in the shape of petals and overlapping discs, responsible for the pressure differential that causes its displacement inside the pipe. These seals have been improved to gradually close when necessary, until reaching the minimum design diameter. In this configuration, the face of the seals normally generates a lot of friction with the inner wall of the pipe, making it difficult to move. To reduce friction, metallic inserts were developed and applied to the seals. A coupling element was also developed to interconnect the different modules of the pig, allowing wide movement of the pig inside the pipe, facilitating its passage, for example, by sharp curves or inside the equipments. Thus, the pig of this invention has overlapping disc and petal-type seals, mechanical centralization and cleaning module and interconnection tubes.

BRIEF DESCRIPTION OF THE DRAWINGS

The present invention will be described in more detail below, with reference to the attached figures which, in a schematic way and not limited of the inventive scope, represent examples of its realization. The drawings show.

DETAILED DESCRIPTION OF THE INVENTION

Figure 1:
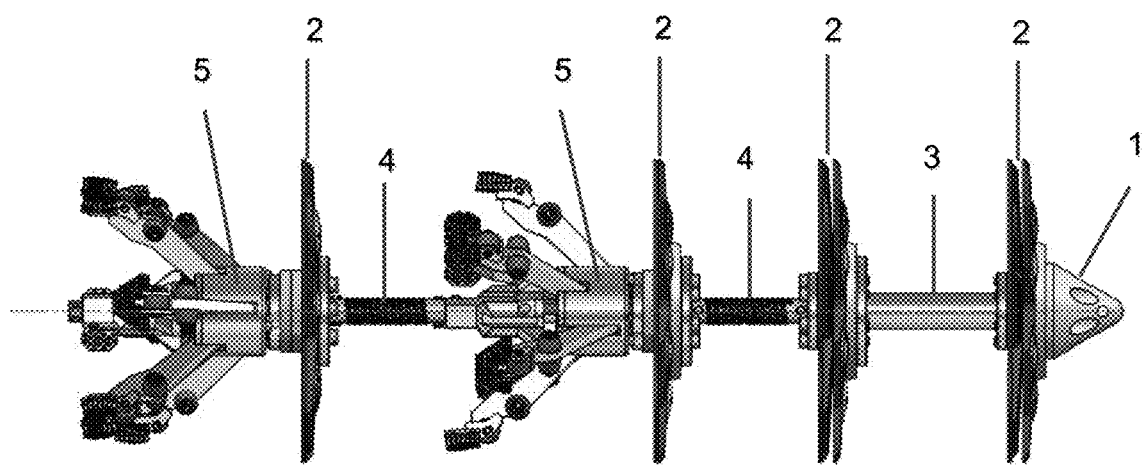
FIG. 1 illustrating the pig as defined in this invention.

Below follows a detailed description of a preferred embodiment of the present invention, by way of example and in no way limiting. Nevertheless, it will be clear to a person skilled in the art, from the reading of this description, possible additional embodiments of the present invention further comprised by the essential and optional features below.

The pipe, wherein the pig object of this invention will be used, has several diameter variations along its length, varying more than 100%, in addition to equipment and accessories installed along its path. Quite briefly, the pig begins its path through a section of smaller diameter, which gives access to the production pipe, passes through the production (or collection) pipe and, at the end, ends its journey in a section with a diameter more than twice the initial section. Although it has to move through different diameters, the project foresees that the cleaning will only occur in a section of intermediate diameter, which corresponds to the production (or collection) pipe.

So the pig must be able to cover the entire pipe, although cleaning is only carried out in a section. To reduce friction between the pig and the pipe and favor its displacement, during the passage in the smaller diameter sections, the cleaning tools do not touch the inner wall of the pipe, wherein the contact with the inner wall of the pipe is carried out by rollers installed in the centralizing arms. It also applies to the final section of larger diameter, where the centering arms of the pig do not reach the inner wall of the pipe due to the use of opening limiters in the mechanical module. In the specific case of this pig, steel brushes were used as a cleaning tool, but other types of tools can be used, according to the type of incrustation existing inside the pipe.

Since there is not in the State of the Art a pig that meets such a wide diameter variation (more than 100%), a concept was started to make the technology viable. The subject pig can operate in pipelines that reach about 125% of diametral variation.

In the development of the pig it was necessary to improve the suspension and centralization system, allowing it to behave properly in any diameter within the range for which it was designed. The polymeric seals in the shape of petals and overlapping discs, responsible for the pressure differential that causes displacement of the pig inside the pipe, were improved to close gradually, when necessary, until reaching the minimum internal diameter of the pipe.

A large diameter variation equates to a larger contact area when the pig passes through the smallest diameter of the pipe and is in a "contracted" shape, with its seals closed, as if forming the geometry of a glass. In addition of having to maintain the seal on any diameter within the pipe diameter range, when the pig acts on the smaller diameter, the contact area with the inner wall becomes very large, increasing friction and making it difficult for the pig to slide inside the pipe.

Despite being initially aimed at application in a pipe with a diameter variation of 125%, the concept of this pig can be extrapolated to pipes with an envelope of different diameters and passing through different equipment. Also, the concept is already being evaluated for other company products.

In the configuration for the smallest diameter, the face of the seals normally generates high friction with the inner wall of the pipe, making it difficult to move. Thus, metal inserts were developed and applied onto seals to reduce the friction.

As the pig is provided with modules with different functions, it was also necessary to develop a coupling element for these modules that would allow the pig to move widely inside the pipe, facilitating its passage through sharp curves, or through the equipment inner.

The scraping elements inside the pipe were designed so that they could scrape deposits along the entire internal perimeter of the pipe, by removing residue from the entire wall without the need for multiple pig passages. Normally, similar pigs manage to scrape around 30% of the internal perimeter in a single pass, thus requiring several passes for complete removal of the deposits.

In order to make it possible to reduce friction on the inner wall of the pipe, metallic wafers (11) of high hardness incrusted in the petals of the seals (2) were added, drastically reducing the contact area when the pig is operating on the smallest diameter. Several attempts were made to fix the wafers on the petals of the seals (2), but the tearing of the metallic wafers (11) occurred along the passage of the pig through the test pipes. Success was obtained when the metallic wafers (11) were fixed in a metallic screen fused inside the petals of the seals (2), generating a unique structure.

Figure 2:
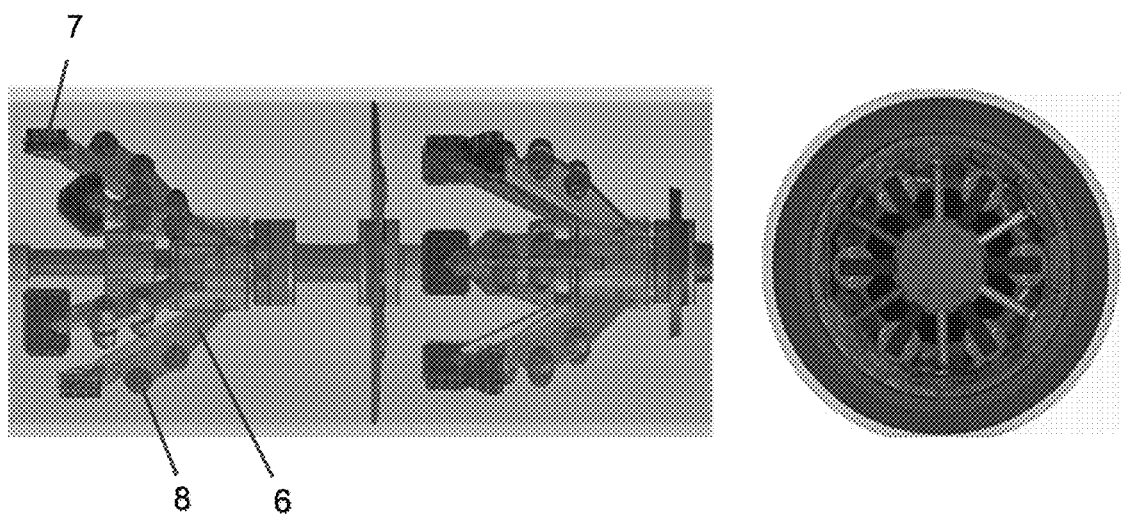
FIG. 2 illustrating the mechanical modules with the cleaning tools at the ends, when operating in a section of duct with a larger diameter.

Another improvement employed corresponds to the geometry and layout of the centralizing arms (6), installed in the mechanical modules (5). In FIG. 2 it can be seen that each mechanical module (5) has six centralizing arms (6), geometrically identical, with cleaning tools (7) installed at the ends, arranged in two sets of 3 centralizing arms (6), positioned in two different planes along the pig shaft. The spacing (9) between the sets of the 3 centering arms (6) allows that, in sections of smaller diameter, the cleaning tools (7) are able to accommodate without interference between them, away from the inner wall of the pipe. The spacing is obtained using rollers (8) installed in the centralizing arms, which also contribute to the reduction of friction with the inner wall of the pipe during the passage of the pig in smaller diameters, the region considered as more critical for the displacement of the pig. Thus, the pig runs through the pipe without contact between the cleaning tools and the inner wall, since this section is not the object of cleaning. The positioning of the arms (6), arranged in two sets of 3 arms distant from each other, also contributes to the balance of the pig, as it forms two lines of support for the body of the pig, instead of a single one.

Figure 3:
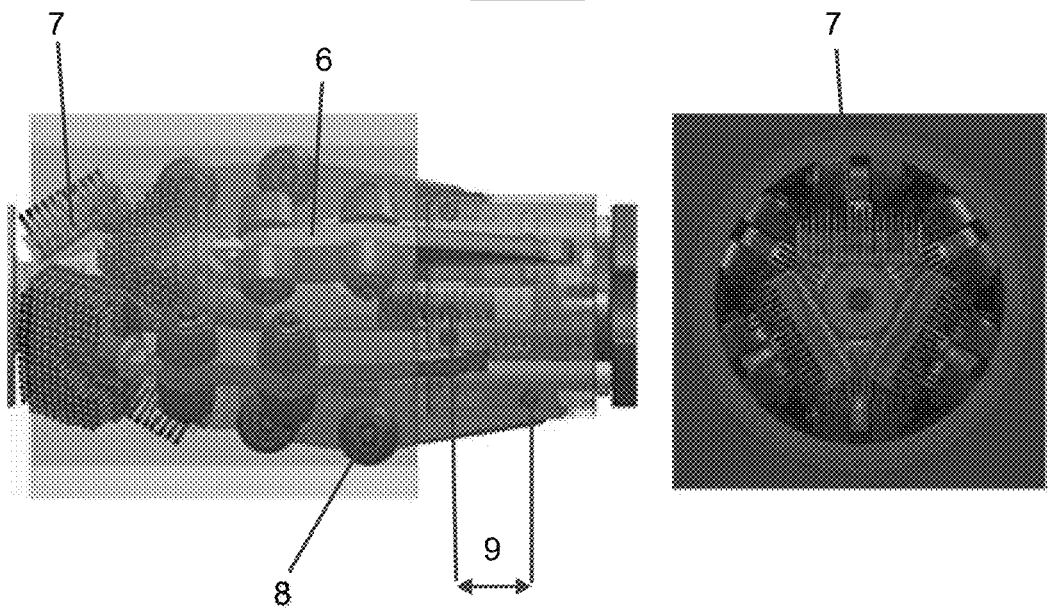
FIG. 3 illustrating the positioning of the cleaning tools, when operating in a section of smaller diameter.
Figure 4:
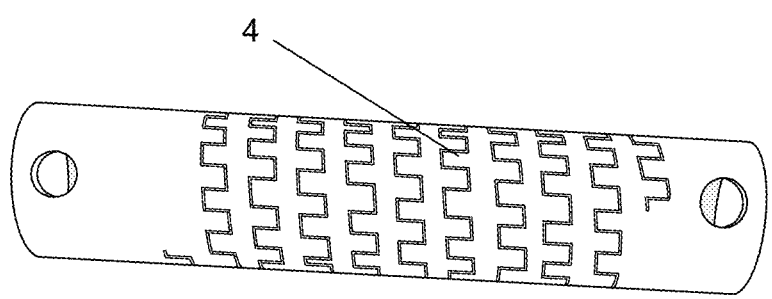
FIG. 4 illustrating the flexible element with special geometry.
Figure 5:
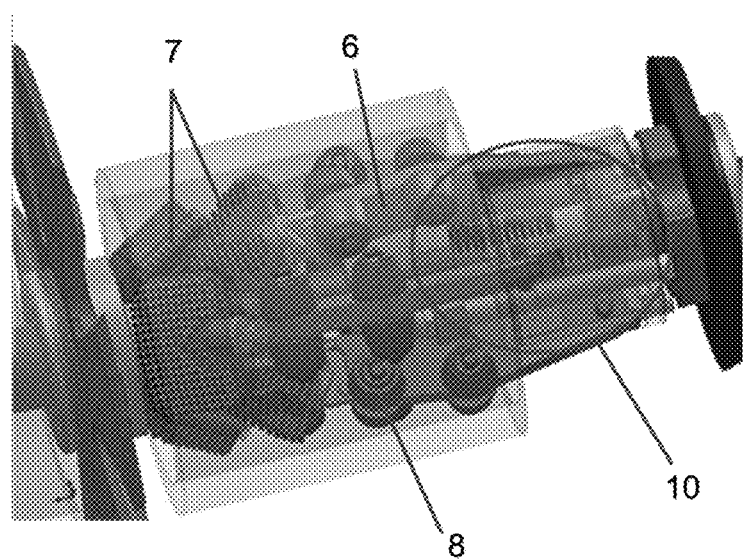
FIG. 5 illustrating the springs acting on two groups of articulated arms.
Figure 6:
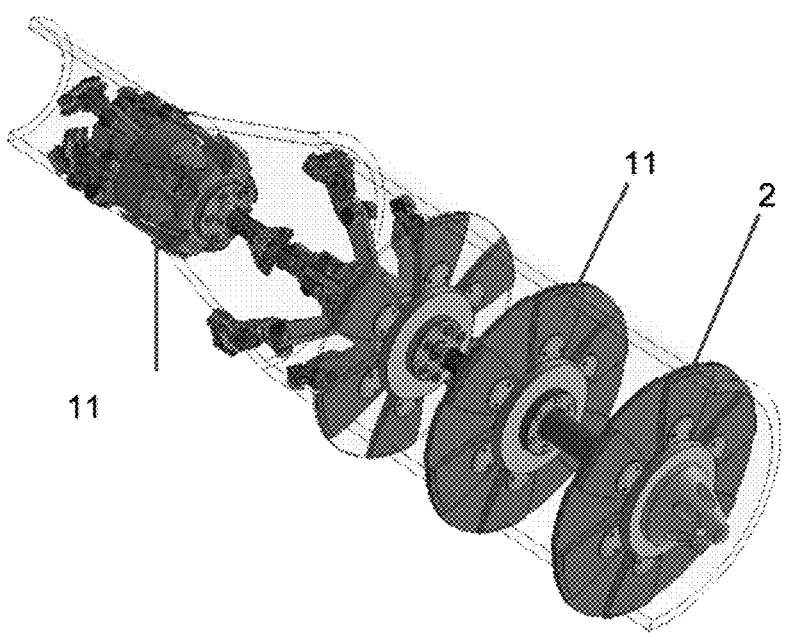
FIG. 6 illustrating the wafers installed in the seals' petals.

In FIG. 3 it can be observed that the cleaning tools (brushes) (7) remain away from the inner wall of the pipe during the passage through the smallest diameter, while the rollers installed in the centralizing arms help to reduce friction during the passage. It is also possible to observe how the positioning of the centralizing arms (6) allows the overlapping without interference between the cleaning tools (7) while the pig runs through the smaller diameter sections of the pipe.

Upon entering the section of intermediate diameter, section of interest for cleaning, the centering arms (6) open by spring action (10), forcing constant contact between the cleaning tools (7) installed at the ends of the arms (6) and the inner wall of the pipe, scraping off encrustations and deposits during the passage of the pig. The use of two mechanical modules (5) 30 degrees apart, totalizing 12 centralizing arms with cleaning tool, guarantees 100% coverage of the pipe perimeter by the cleaning tools (7) in a single passage of the pig. Normally, in commercial pigs, several passages are necessary (quantified by statistical evaluation) so that the entire pipe inner receives contact from the cleaning tools (7). An alternative would be the use of several mechanical cleaning modules (5) in the assembly of the pig to cover a larger perimeter, which may make the use of the pig unfeasible due to the increased length of the equipment. In FIG. 2 it can be observed how the two mechanical cleaning modules (5) (total of 12 centralizing arms) reach 100% of the perimeter of the pipe.

The 30-degree offset of the two mechanical cleaning modules (5) (containing 6 centralizing arms each) allows the modules to complement each other in the function of covering the entire internal perimeter of the pipe. To ensure that this offset will be maintained during the passage of the pig, a differentiated flexible element (4) was used to connect the modules. Its special geometry was obtained through laser cutting of a rigid tube, resulting in a structure with interlocking elements, which allows accentuated flexural movements of the pig, but prevents stretching and twisting between modules.

As mentioned, the contact force of the cleaning tools (7) with the inner wall of the pipe is obtained by the action of springs (10) that act on the centralizing arms (6). Several configurations were tested, such as the use of individual springs acting on each centralizing arm (6), which caused the pig to become unbalanced, especially during the passage through derivations, when some arms lost contact with the inner wall of the pipe. A single system of springs acting on all arms simultaneously was also tested, but it was noted the imbalance in the pig during the passage in curved sections of the pipe, since some arms lost contact with the inner wall of the pipe.

To solve this issue, a force distribution system was developed in which the action of the springs (10) is applied to each set of 3 centralizing arms simultaneously, only. Thus, during the passage through a derivation, the centralizing arm (6) that loses contact with the inner wall of the pipe has its opening movement limited by the other two of its set. And, when in curved sections, a set of 3 arms compensates for the possible loss of contact with an element of another set.

Additionally, when there is a diameter change in the pipe, the centralizing arms (6) only expand or retract to other diameters when all 3 arms of the set perceive this diameter variation, avoiding unbalance and unwanted torsion of the pig. The spring system was also designed to allow the replacement of the springs (10), allowing the variation of the contact force of the cleaning tools (7) with the inner wall of the pipe, adapting to the type of deposit to be removed.

The pig proposed herein, illustrated in FIG. 1, comprises nose (1), seals (2), rigid coupling pipeline (3), flexible coupling pipelines (4), mechanical modules (5) with centralizing arms.

The invention claimed is:

1. A multi-diameter cleaning pig, comprising:
   a plurality of seals;
   a nose connected to a first seal of the plurality of seals;
   a rigid coupling pipeline connected between the first seal and a second seal of the plurality of seals;
   a first mechanical module and a second mechanical module, wherein each of the first and second mechanical modules comprises six centralizing arms arranged in two sets of three arms positioned in two different planes along a shaft, wherein an end of each centralizing arm is coupled to a cleaning tool, wherein the first mechanical module is connected to a third seal of the plurality of seals and wherein the second mechanical module is connected to a fourth seal of the plurality of seals;
   a first and second flexible coupling pipeline, wherein the first flexible coupling pipeline is connected to the second seal and the third seal, and wherein the second flexible coupling pipeline is connected to the first mechanical module and the fourth seal.

2. The multi-diameter cleaning pig of claim 1, wherein the centralizing arms are configured to extend radially to accommodate a pipe with a diametral variation greater than 100%.

3. The multi-diameter cleaning pig of claim 1, wherein the plurality of seals comprise a petal shape with overlapping polymeric discs which are configured to close gradually.

4. The multi-diameter cleaning pig of claim 3, wherein the plurality of seals comprise metal wafers of high hardness, to reduce friction.

5. The multi-diameter cleaning pig of claim 4, wherein the metallic wafers are fixed in a metallic screen fused inside each of the plurality of seals.

6. The multi-diameter cleaning pig for of claim 1, wherein the six centralizing arms open by spring action.

7. The multi-diameter cleaning pig of claim 1, wherein the six centralizing arms of the first mechanical module are offset from the six centralizing arms of the second mechanical module by 30 degrees.

8. The multi-diameter cleaning pig of claim 1, wherein the cleaning tools coupled at the ends of the arms are interchangeable.

9. The multi-diameter cleaning pig of claim 6, wherein on each set of the three centralizing arms comprises a spring action configured to limit the movement of the arms when passing through a branch or curve in a pipe.

10. The multi-diameter cleaning pig of claim 1, wherein the first and second flexible coupling pipelines allow accentuated flexural movements of the pig while preventing stretching and twisting between the first and second mechanical modules.

* * * * *